United States Patent
Hua

(10) Patent No.: US 10,148,702 B2
(45) Date of Patent: Dec. 4, 2018

(54) SESSION ASSOCIATION METHOD, APPARATUS, AND SYSTEM

(71) Applicant: Huawei Technologies Co., Ltd., Shenzhen (CN)

(72) Inventor: Yue Hua, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 514 days.

(21) Appl. No.: 14/921,542

(22) Filed: Oct. 23, 2015

(65) Prior Publication Data

US 2016/0044063 A1 Feb. 11, 2016

Related U.S. Application Data

(63) Continuation of application No. PCT/CN2014/074238, filed on Mar. 28, 2014.

(30) Foreign Application Priority Data

Apr. 24, 2013 (CN) .......................... 2013 1 0144870

(51) Int. Cl.
  *H04L 29/06* (2006.01)
(52) U.S. Cl.
  CPC ...... *H04L 65/1046* (2013.01); *H04L 65/1006* (2013.01); *H04L 65/1043* (2013.01); *H04L 65/1069* (2013.01); *H04L 65/608* (2013.01); *H04L 65/80* (2013.01)
(58) Field of Classification Search
  CPC . H04L 65/1046; H04L 65/1043; H04L 65/80; H04L 65/608; H04L 65/1069; H04L 65/1006
  See application file for complete search history.

(56) References Cited

U.S. PATENT DOCUMENTS

| 2009/0131053 | A1 | 5/2009 | Sachs et al. |
| 2009/0274163 | A1* | 11/2009 | Huang ................. H04L 47/782 370/432 |
| 2010/0080211 | A1* | 4/2010 | Bossler ................ H04W 76/10 370/352 |
| 2011/0047282 | A1* | 2/2011 | Denman .............. H04L 65/605 709/231 |

(Continued)

FOREIGN PATENT DOCUMENTS

| CN | 101167392 A | 4/2008 |
| CN | 101212522 A | 7/2008 |

(Continued)

OTHER PUBLICATIONS

Partial English Translation and Abstract of Japanese Patent Application No. JP2004248192, Sep. 2, 2004, 11 pages.

(Continued)

*Primary Examiner* — Andrew Lai
*Assistant Examiner* — Harry H Kim
(74) *Attorney, Agent, or Firm* — Conley Rose, P.C.

(57) ABSTRACT

A session association method, apparatus, and system. The method includes collecting call control signaling, on a signaling link of a control plane in a communications network, transmitted by network elements, where the call control signaling includes speech channel information; and performing session association on the call control signaling according to the speech channel information.

15 Claims, 7 Drawing Sheets

(56) References Cited

U.S. PATENT DOCUMENTS

| | | | |
|---|---|---|---|
| 2011/0085485 A1* | 4/2011 | Yoon | H04W 52/146 370/311 |
| 2011/0292914 A1 | 12/2011 | Sachs et al. | |
| 2012/0120892 A1* | 5/2012 | Freda | H04W 8/005 370/329 |
| 2013/0223437 A1* | 8/2013 | Lanzinger | H04L 29/125 370/352 |
| 2013/0294326 A1 | 11/2013 | Jiao et al. | |
| 2014/0164633 A1 | 6/2014 | Bi et al. | |
| 2017/0118257 A1* | 4/2017 | De Foy | H04L 65/1096 |

FOREIGN PATENT DOCUMENTS

| | | |
|---|---|---|
| CN | 101409886 A | 4/2009 |
| CN | 101521674 A | 9/2009 |
| CN | 101873238 A | 10/2010 |
| CN | 101873656 A | 10/2010 |
| CN | 101959258 A | 1/2011 |
| CN | 102083006 A | 6/2011 |
| CN | 102905390 A | 1/2013 |
| CN | 103269334 A | 8/2013 |
| EP | 1039687 A2 | 9/2000 |
| EP | 2493139 A1 | 8/2012 |
| JP | 2004248192 A | 9/2004 |
| JP | 2005253082 A | 9/2005 |
| JP | 2010141855 A | 6/2010 |
| JP | 2012120085 A | 6/2012 |
| RU | 2414082 C2 | 3/2011 |
| RU | 2438246 C2 | 12/2011 |
| WO | 2010121521 A1 | 10/2010 |
| WO | 2012097699 A1 | 7/2012 |

OTHER PUBLICATIONS

Partial English Translation and Abstract of Japanese Patent Application No. JP2005253082, Sep. 15, 2005, 28 pages.
Partial English Translation and Abstract of Japanese Patent Application No. JP2010141855, Jun. 24, 2010, 47 pages.
Partial English Translation and Abstract of Japanese Patent Application No. JP2012120085, Jun. 21, 2012, 21 pages.
Foreign Communication From a Counterpart Application, Japanese Application No. 2016509274, Japanese Office Action dated Jan. 10, 2017, 3 pages.
Foreign Communication From a Counterpart Application, Japanese Application No. 2016509274, English Translation of Japanese Office Action dated Jan. 10, 2017, 4 pages.
Partial English Translation and Abstract of Chinese Patent Application No. CN101873238, Sep. 1, 2015, 8 pages.
Partial English Translation and Abstract of Chinese Patent Application No. CN101959258, Sep. 1, 2015, 8 pages.
Partial English Translation and Abstract of Chinese Patent Application No. CN101873656, Oct. 8, 2015, 4 pages.
Partial English Translation and Abstract of Chinese Patent Application No. CN103269334, Oct. 8, 2015, 3 pages.
Foreign Communication From a Counterpart Application, Chinese Application No. 201310144870.1, Chinese Office Action dated Jul. 24, 2015, 8 pages.
Foreign Communication From a Counterpart Application, PCT Application No. PCT/CN2014/074238, English Translation of International Search Report dated Jul. 8, 2014, 2 pages.
Foreign Communication From a Counterpart Application, PCT Application No. PCT/CN2014/074238, English Translation of Written Opinion dated Jul. 8, 2014, 10 pages.
Foreign Communication From a Counterpart Application, European Application No. 14787992.8, Extended European Search Report dated Mar. 18, 2016, 7 pages.
Foreign Communication From a Counterpart Application, Russian Application No. 2015150060, Russian Office Action dated Mar. 14, 2017, 8 pages.
Foreign Communication From a Counterpart Application, Russian Application No. 2015150060, English Translation of Russian Office Action dated Mar. 14, 2017, 6 pages.
Foreign Communication From a Counterpart Application, PCT Application No. PCT/CN2014/074238, English Translation of International Search Report dated Mar. 13, 2017, 2 pages.

* cited by examiner

SESSION ASSOCIATION METHOD, APPARATUS, AND SYSTEM

CROSS-REFERENCE TO RELATED APPLICATIONS

This application is a continuation of International Application No. PCT/CN2014/074238, filed on Mar. 28, 2014, which claims priority to Chinese Patent Application No. 201310144870.1, filed on Apr. 24, 2013, both of which are hereby incorporated by reference in their entireties.

TECHNICAL FIELD

The present invention relates to the field of communications technologies, and in particular, to a session association method, apparatus, and system.

BACKGROUND

A communications network monitoring system is an important system which allows an operator to perform active monitoring and management. In a working process of the communications network monitoring system, various types of signaling and media data of a communications network are collected in a manner which does not affect network operation, where the manner includes high resistance cross-connection, port mirroring, splitting by an optical splitter; the collected signaling and media data is then sent to a data center; the data center performs decoding, association, call/session detail record (CDR)/transaction detail record (TDR) integration on the signaling and media data, to reproduce a whole service process, so as to collect statistics on all types of indexes about a network, a user, and a service. In this way, network maintenance personnel master and analyze network and service operation situations, market management personnel master and analyze user behaviors and service usage, and managerial personnel obtain a quantitative basis supporting decision-making. Using a voice service as an example, a call/session between users generally appears as a control stream on a control plane, and appears as a media stream on a user plane of a communications network, where both the control stream and the media stream are relayed and mediated by a series of network elements, and the network element may be a mobile switching center server (MSC), a media gateway (MGW), or the like. The communications network monitoring system collects various types of signaling and media data on a communications link between network elements; therefore, from the perspective of a call/session between users, the collected signaling and media data belongs to a single interface between network elements and are segmented, and the communications network monitoring system must associate the collected signaling and media data of each single interface, so as to obtain end-to-end call/session information. This process performed by the communications network monitoring system is referred to as multi-protocol multi-interface association. The communications network monitoring system can evaluate and analyze a communications network from the perspective of a whole network, a user, and a service only after completing the foregoing process.

In the prior art, the communications network monitoring system performs multi-protocol multi-interface association on a call/session based on an assumption that, for a same call/session, calling and called subscriber numbers collected on interfaces at both sides of a network element are the same. Calling and called subscriber numbers carried in collected call control signaling are used as an association basis, and the communications network monitoring system may associate, by comparing whether the calling and called subscriber numbers carried in the call control signaling collected on the interface at two sides of the network element are the same, single interfaces belonging to a same call/session.

However, in the foregoing method, because of demands for various types of services and routing based on a subscriber number, when mediating a call/session, a network element in a communications network often regulates and changes calling and called subscriber numbers; therefore, if association is performed according to subscriber numbers, accuracy of multi-protocol multi-interface association is affected, thereby seriously affecting reliability of the communications network monitoring system.

SUMMARY

Embodiments of the present invention provide a session association method, apparatus, and system, so as to improve accuracy of session association and further improve reliability of a communications network monitoring system.

According to a first aspect, an embodiment of the present invention provides a session association method, including collecting call control signaling, on a signaling link of a control plane in a communications network, transmitted by network elements, where the call control signaling includes speech channel information; and performing session association on the call control signaling according to the speech channel information.

In a first possible implementation manner of the first aspect, collecting call control signaling, on a signaling link of a control plane, transmitted by network elements includes collecting first call control signaling, on the signaling link of the control plane, between the network elements and a calling subscriber, and second call control signaling, on the signaling link of the control plane, between the network elements and a called subscriber; and performing session association on the call control signaling according to the speech channel information includes performing session association on the first call control signaling and the second call control signaling according to the speech channel information.

With reference to the first possible implementation manner of the first aspect, in a second possible implementation manner of the first aspect, the communications network is a packet switched bearer network, and the speech channel information is a user plane address; and performing session association on the first call control signaling and the second call control signaling according to the speech channel information includes, if a first user plane address included in the first call control signaling and a second user plane address included in the second call control signaling are the same, performing session association on the first call control signaling and the second call control signaling.

With reference to the first possible implementation manner of the first aspect, in a third possible implementation manner of the first aspect, the communications network is a packet switched bearer network, and the speech channel information is a user plane address; and, before the collecting of first call control signaling, on the signaling link of the control plane, between the network elements and a calling subscriber, and second call control signaling, on the signaling link of the control plane, between the network elements and a called subscriber, the method further includes obtaining an association relationship between user plane addresses; and performing session association on the first call control signaling and the second call control signaling according to the speech channel information includes, if it is determined, according to the association relationship, that an association exists between a first user plane address included in the first call control signaling and a second user plane address included in the second call control signaling, performing session association on the first call control signaling and the second call control signaling.

With reference to the first possible implementation manner of the first aspect, in a fourth possible implementation manner of the first aspect, the communications network is a circuit switched bearer network, and the speech channel information is a circuit identification code; and, before the collecting of first call control signaling, on the signaling link of the control plane, between the network elements and a calling subscriber, and second call control signaling, on the signaling link of the control plane, between the network elements and a called subscriber, the method further includes obtaining an association relationship between circuit identification codes; and performing session association on the first call control signaling and the second call control signaling according to the speech channel information includes, if it is determined, according to the association relationship, that an association exists between a first circuit identification code included in the first call control signaling and a second circuit identification code included in the second call control signaling, performing session association on the first call control signaling and the second call control signaling.

With reference to any one of the first aspect to the fourth possible implementation manner of the first aspect, in a fifth possible implementation manner of the first aspect, the communications network is a mobile softswitch (CS) network, and the network elements include an MSC Server or an MSC Server and an MGW; or the communications network is a fixed-line softswitch (NGN) network, and the network elements include a fixed-line softswitch or the softswitch and an access gateway (AG)/trunk gateway (TG); or the communications network is an internet protocol (IP) multimedia subsystem (IMS) network, and the network elements include a call/session control function (CSCF), a breakout gateway control function (BGCF), an interconnection border control function (IBCF), a media gateway control function (MGCF), and an application server (AS); an IBCF and a transition gateway (TrGW), an MGCF and an IMS media gateway (IM-MGW), a multimedia resource function controller (MRFC) and a multimedia resource function processor (MRFP), and a service-based policy decision function (SPDF) and a border gateway function (BGF); or an MGCF and an IM-MGW.

According to a second aspect, an embodiment of the present invention provides a monitoring apparatus, including a collection module configured to collect call control signaling, on a signaling link of a control plane in a communications network, transmitted by network elements, where the call control signaling includes speech channel information; and an association module configured to perform session association on the call control signaling according to the speech channel information.

In a first possible implementation manner of the second aspect, the collection module is configured to collect first call control signaling, on the signaling link of the control plane, between the network elements and a calling subscriber, and second call control signaling, on the signaling link of the control plane, between the network elements and a called subscriber; and the association module is configured to perform session association on the first call control signaling and the second call control signaling according to the speech channel information.

With reference to the first possible implementation manner of the second aspect, in a second possible implementation manner of the second aspect, the communications network is a packet switched bearer network, and the speech channel information is a user plane address; and the association module is configured to, if a first user plane address included in the first call control signaling and a second user plane address included in the second call control signaling are the same, perform session association on the first call control signaling and the second call control signaling.

With reference to the first possible implementation manner of the second aspect, in a third possible implementation manner of the second aspect, the communications network is a packet switched bearer network, and the speech channel information is a user plane address; and the apparatus further includes a first obtaining module configured to, before the collection module collects the first call control signaling, on the signaling link of the control plane, between the network elements and a calling subscriber, and the second call control signaling, on the signaling link of the control plane, between the network elements and a called subscriber, obtain an association relationship between user plane addresses, where the association module is configured to, if it is determined, according to the association relationship, that an association exists between a first user plane address included in the first call control signaling and a second user plane address included in the second call control signaling, perform session association on the first call control signaling and the second call control signaling.

With reference to the first possible implementation manner of the second aspect, in a fourth possible implementation manner of the second aspect, the communications network is a circuit switched bearer network, and the speech channel information is a circuit identification code; and the apparatus further includes a second obtaining module configured to, before the collection module collects the first call control signaling, on the signaling link of the control plane, between the network elements and a calling subscriber, and the second call control signaling, on the signaling link of the control plane, between the network elements and a called subscriber, obtain an association relationship between circuit identification codes, where the association module is configured to, if it is determined, according to the association relationship, that an association exists between a first circuit identification code included in the first call control signaling and a second circuit identification code included in the second call control signaling, perform session association on the first call control signaling and the second call control signaling.

According to a third aspect, an embodiment of the present invention provides a communications system, including a monitoring apparatus and at least one network element in a communications network, where the monitoring apparatus is configured to collect call control signaling, on a signaling link of a control plane in a communications network, transmitted by the at least one network element, where the call control signaling includes speech channel information; and perform session association on the call control signaling according to the speech channel information.

With reference to the third aspect, in a first possible implementation manner of the third aspect, the monitoring apparatus is configured to collect first call control signaling, on the signaling link of the control plane, between the network elements and a calling subscriber, and second call control signaling, on the signaling link of the control plane, between the network elements and a called subscriber; and perform session association on the first call control signaling and the second call control signaling according to the speech channel information.

With reference to the third aspect or the first possible implementation manner of the third aspect, in a second possible implementation manner of the third aspect, the communications network is a CS network, and the network elements include an MSC Server or an MSC Server and an MGW; or the communications network is an NGN network, and the network elements include a fixed-line softswitch or the softswitch and an AG/TG; or the communications network is an IMS network, and the network elements include a CSCF, a BGCF, an IBCF, an MGCF, and an AS; an IBCF and a TrGW, an MGCF and an IM-MGW, an MRFC and an MRFP, and an SPDF and a BGF; or an MGCF and an IM-MGW.

According to the session association method, apparatus, and system provided in the embodiments of the present invention, a monitoring system collects call control signaling, on a signaling link of a control plane in a communications network, transmitted by network elements, where the call control signaling includes speech channel information; and the monitoring system performs session association on the call control signaling according to the speech channel information. Because of inevitability and uniqueness of a speech channel in a call/session, the monitoring system can implement accurate association by performing session association according to the speech channel information, so as to improve accuracy of session association, further improve reliability of the communications network monitoring system, and provide a reliable guarantee for the communications network monitoring system to evaluate and analyze a communications network from the perspective of a whole network, a user, and a service, thereby ensuring end-to-end network quality, user sensing, service quality; and implementing end-to-end call/session tracking, and complaint and fault processing.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by persons of ordinary skill in the art based on the embodiments of the present invention without creative efforts shall fall within the protection scope of the present invention.

Figure 1:
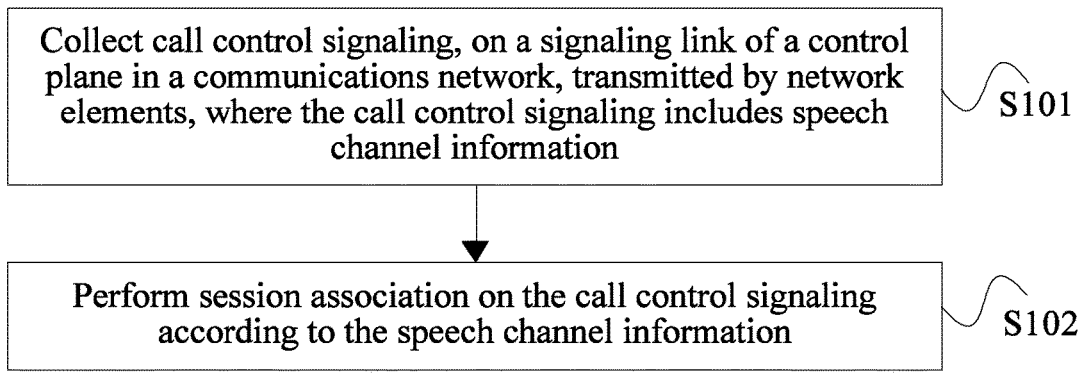
FIG. 1 is a flowchart of Embodiment 1 of a session association method according to the present invention.

FIG. 1 is a flowchart of Embodiment 1 of a session association method according to the present invention. The session association method provided in this embodiment is used by a communications network monitoring system to perform multi-protocol multi-interface association on collected signaling and media data of each single interface in a communications network, so as to obtain end-to-end call/session information, so that the communications network monitoring system evaluates and analyzes a communications network from the perspective of a whole network, a user, and a service, thereby providing end-to-end network quality, user sensing, quality of service, end-to-end call/session tracking, and complaint and fault processing. It should be noted that the session association method provided in this embodiment is applicable to monitoring of all communications networks in which control and bearer are separated, where the communications networks include a CS network, an NGN network, and an IMS network. This embodiment provides descriptions by using an example in which a monitoring system is an execution body. As shown in FIG. 1, the method in this embodiment may include the following steps.

S101: Collect call control signaling, on a signaling link of a control plane in a communications network, transmitted by network elements, where the call control signaling includes speech channel information.

S102: Perform session association on the call control signaling according to the speech channel information.

A monitoring system collects the call control signaling, on the signaling link of the control plane in the communications network, transmitted by the network elements, where the call control signaling includes the speech channel information; and the monitoring system performs session association on the call control signaling according to the speech channel information. It should be noted herein that subscriber number information and the speech channel information do not belong to a same category. In this embodiment, the monitoring system takes advantage of inevitability and uniqueness of a speech channel in a call/session, and performs session association according to the speech channel information included in the call control signaling. This embodiment mainly describes session association at two sides of a single network element, and as long as session association at two sides of a single network element succeeds, end-to-end association can also be successfully implemented for a call/session mediated and relayed by a plurality of network elements. In addition, for a user plane, as long as end-to-end association at a control plane is completed, end-to-end association at the user plane can be completed by matching speech channel information at the control plane with a speech channel at the user plane.

A process in which the monitoring system performs session association at two sides of a single network element is as follows.

S101a: The monitoring system collects first call control signaling, on the signaling link of the control plane, between the network elements and a calling subscriber, and second call control signaling, on the signaling link of the control plane, between the network elements and a called subscriber.

S102a: The monitoring system performs session association on the first call control signaling and the second call control signaling according to the speech channel information.

For different networks and different scenarios in different networks, there are three possible implementation manners in the following.

1. When the communications network is a packet switched bearer network, the speech channel information is a user plane address, and a network element of a core network is not inserted into a user plane, that is, in a scenario in which the network element of the core network only provides functions of a call mediation node (CMN) of the control plane, the performing of session association on the first call control signaling and the second call control signaling according to the speech channel information in step S102a includes, if a first user plane address included in the first call control signaling and a second user plane address included in the second call control signaling are the same, performing, by the monitoring system, session association on the first call control signaling and the second call control signaling.

The network elements in this scenario may include an MSC Server in a CS network; a fixed softswitch in an NGN network; and a CSCF, a BGCF, an IBCF, an MGCF, and an AS in an IMS network.

2. When the communications network is a packet switched bearer network, the speech channel information is a user plane address, and a network element of a core network is inserted into a user plane, that is, in a scenario in which the network element of the core network provides a control plane function and a user plane function, before step S101a, the method further includes obtaining an association relationship between user plane addresses, where the performing session association on the first call control signaling and the second call control signaling according to the speech channel information in step S102a includes, if it is determined, according to the association relationship, that an association exists between a first user plane address included in the first call control signaling and a second user plane address included in the second call control signaling, performing session association on the first call control signaling and the second call control signaling.

The network elements in this scenario may include an MSC Server and an MGW in a CS network; a softswitch and an AG/TG in an NGN network; and an IBCF and a TrGW, an MGCF and an IM-MGW, an MRFC and an MRFP, and an SPDF and a BGF in an IMS network.

3. When the communications network is a circuit switched bearer network, and the speech channel information is a circuit identification code, before step S101a, the method further includes obtaining an association relationship between circuit identification codes, where the performing session association on the first call control signaling and the second call control signaling according to the speech channel information in step S102a includes, if it is determined, according to the association relationship, that an association exists between a first circuit identification code included in the first call control signaling and a second circuit identification code included in the second call control signaling, performing session association on the first call control signaling and the second call control signaling.

The network elements in this scenario may include an MSC Server and an MGW in a CS network; a softswitch and an AG/TG in an NGN network; and an MGCF and an IM-MGW in an IMS network.

In the foregoing embodiment, the call control signaling may be signaling defined in the following protocols: a session initiation protocol (SIP), a session initiation protocol with encapsulated integrated services digital network user part (SIP-I), a session initiation protocol for telephones (SIP-T), bearer independent call control (BICC), a Telecommunication Standardization Sector of the International Telecommunications Union (ITU-T) H.323 protocol family, a base station subsystem management application part (BSSMAP), a radio access network application part (RANAP), an integrated services digital network user part (ISUP), a telephone user part (TUP), an ITU-T H.248 protocol family, a media gateway control protocol (MGCP), and an ITU-T Q.931 protocol family.

According to the session association method provided in this embodiment, a monitoring system collects call control signaling, on a signaling link of a control plane, transmitted by network elements, where the call control signaling includes speech channel information; and the monitoring system performs session association on the call control signaling according to the speech channel information. Because of inevitability and uniqueness of a speech channel in a call/session, the monitoring system can implement accurate association by performing session association according to the speech channel information, so as to improve accuracy of session association, further improve reliability of a communications network monitoring system, and provide a reliable guarantee for the communications network monitoring system to evaluate and analyze a communications network from the perspective of a whole network, a user, and a service, thereby providing end-to-end network quality, user sensing, quality of service, end-to-end call/session tracking, and complaint and fault processing.

Several specific embodiments are used in the following to describe in detail the technical solution of the method embodiment shown in FIG. 1.

Figure 2:
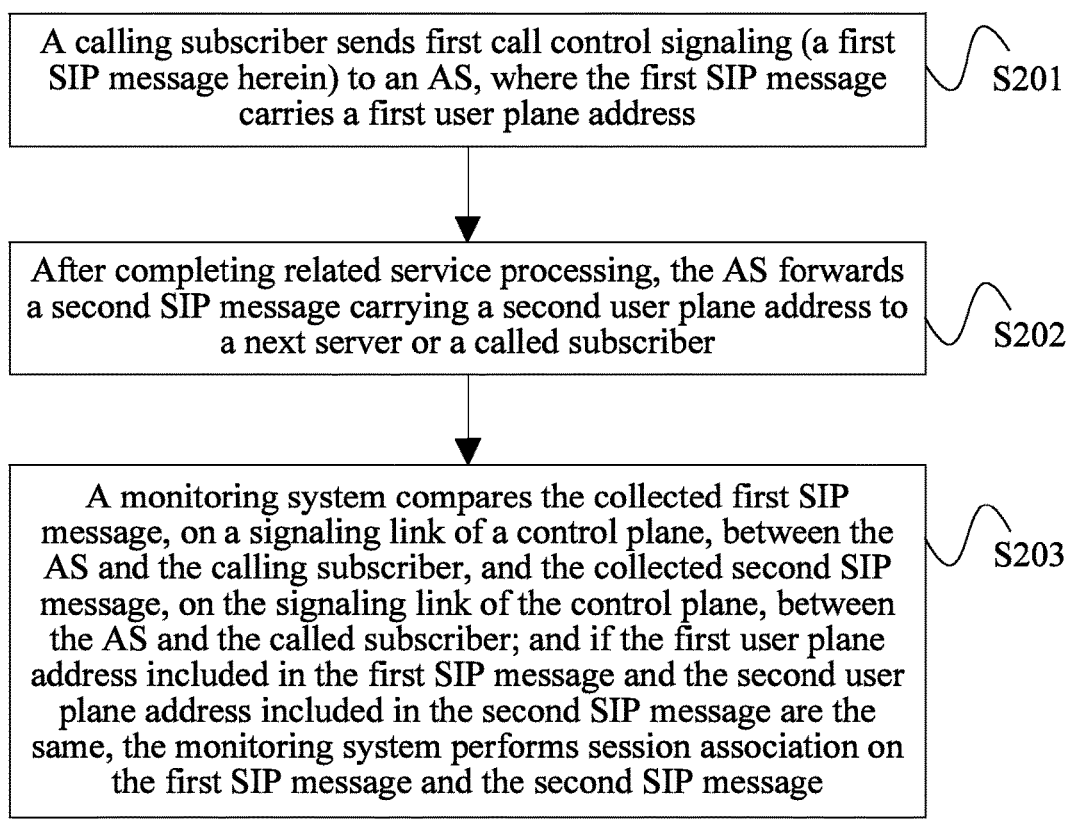
FIG. 2 is a flowchart of Embodiment 2 of a session association method according to the present invention.
Figure 3:
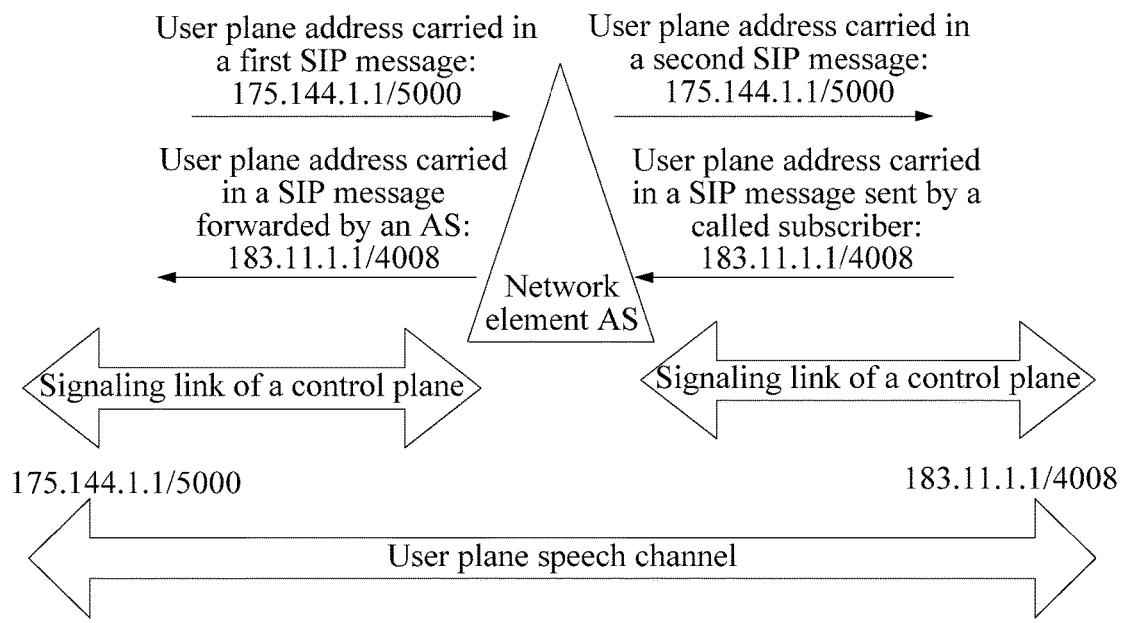
FIG. 3 is a schematic diagram of call control signaling and a network element in Embodiment 2 of the session association method according to the present invention.

FIG. 2 is a flowchart of Embodiment 2 of a session association method according to the present invention. FIG. 3 is a schematic diagram of call control signaling and a network element in Embodiment 2 of the session association method according to the present invention. With reference to FIG. 3, in this embodiment, a scenario, in which a communications network is a packet switched bearer network, and speech channel information is a user plane address, and a network element of a core network is not inserted into a user plane, is used as an example for description; for example, the network element is an AS, and call control signaling is a SIP message. As shown in FIG. 2 and FIG. 3, the method in this embodiment may include the following steps.

S201: A calling subscriber sends first call control signaling (a first SIP message herein) to an AS, where the first SIP message carries a first user plane address, that is, a user plane address of the calling subscriber, for example, the user plane address of the calling subscriber is 175.144.1.1/5000.

S202: After completing related service processing, the AS forwards a second SIP message carrying a second user plane address to a next server or a called subscriber, where the second user plane address forwarded by the AS is the same as the first user plane address, and is also 175.144.1.1/5000.

Similar to the foregoing step, a 183 response that is sent by the called subscriber to the AS and is used for responding to session establishment also carries a user plane address of the called subscriber, for example, the user plane address of the called subscriber is 183.11.1.1/4008. The user plane address sent by the AS to the calling subscriber in the forwarded 183 response remains unchanged, and is also 183.11.1.1/4008.

S203: A monitoring system compares the collected first SIP message, on a signaling link of a control plane, between the AS and the calling subscriber, and the collected second SIP message, on the signaling link of the control plane, between the AS and the called subscriber; and if the first user plane address included in the first SIP message and the second user plane address included in the second SIP message are the same, the monitoring system performs session association on the first SIP message and the second SIP message. The user plane addresses 175.144.1.1/5000 may be compared, or the user plane addresses 183.11.1.1/4008 may be compared. If the user plane addresses are the same, session association may be performed on the first SIP message and the second SIP message.

Figure 4:
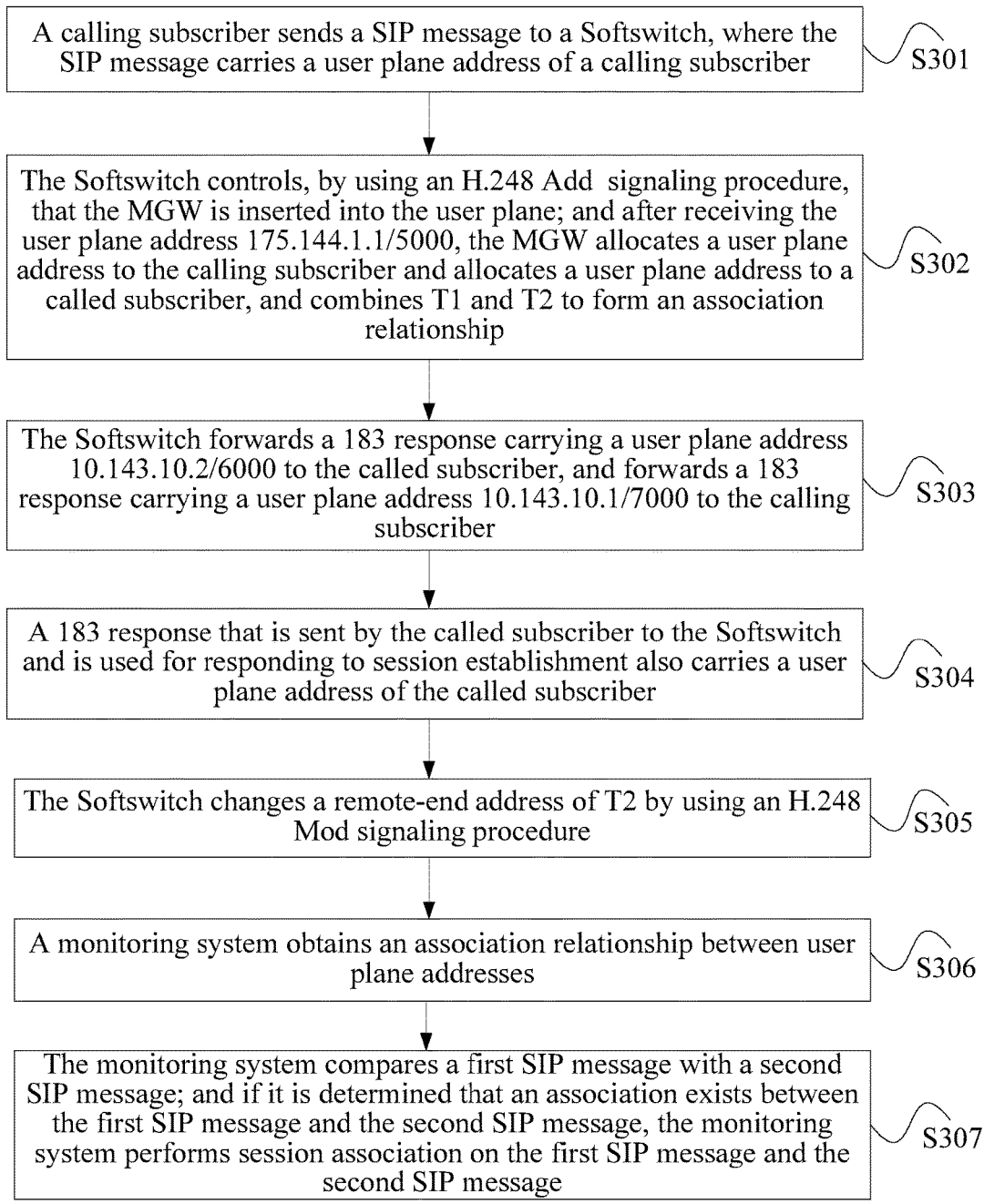
FIG. 4 is a flowchart of Embodiment 3 of a session association method according to the present invention.
Figure 5:
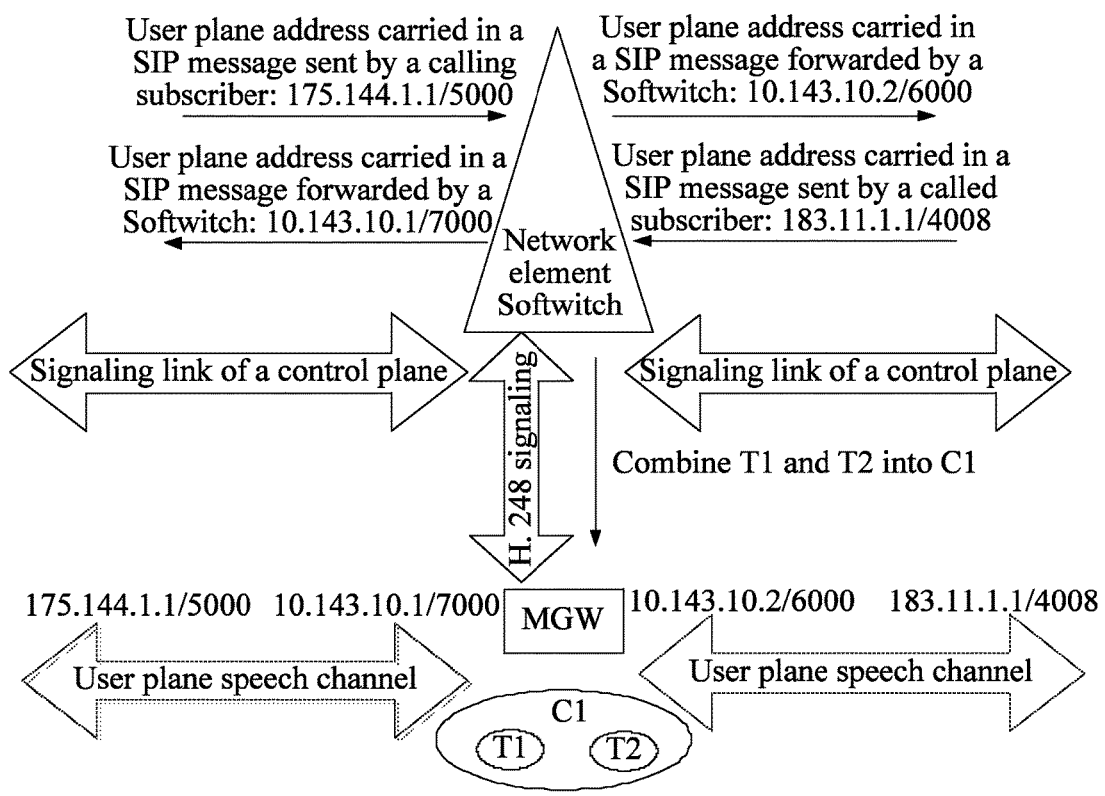
FIG. 5 is a schematic diagram of call control signaling and a network element in Embodiment 3 of the session association method according to the present invention.

FIG. 4 is a flowchart of Embodiment 3 of a session association method according to the present invention. FIG. 5 is a schematic diagram of call control signaling and a network element in Embodiment 3 of the session association method according to the present invention. With reference to FIG. 5, in this embodiment, a scenario, in which a communications network is a packet switched bearer network, speech channel information is a user plane address, and a network element of a core network is inserted into a user plane, is used as an example for description, where for example, an MGW is inserted into a user plane, and a speech channel of the user plane is cut into two segments by the MGW; for example, the network element is a softswitch, and call control signaling is a SIP message. As shown in FIG. 4 and FIG. 5, the method in this embodiment may include the following steps.

S301: A calling subscriber sends a SIP message to a softswitch, where the SIP message carries a user plane address of the calling subscriber, for example, the user plane address of the calling subscriber is 175.144.1.1/5000.

S302: The softswitch controls, by using an H.248 Add signaling procedure, that the MGW is inserted into the user plane; after receiving the user plane address 175.144.1.1/5000, the MGW allocates a user plane address 10.143.10.1/7000 to the calling subscriber and allocates a user plane address 10.143.10.2/6000 to the called subscriber, and combines T1 (a remote-end address 175.144.1.1/5000, a local-end address 10.143.10.1/7000) and T2 (a remote-end address 10.143.10.2/6000) into C1 to form an association relationship.

S303: The softswitch forwards a 183 response carrying the user plane address 10.143.10.2/6000 to the called subscriber, and forwards a 183 response carrying the user plane address 10.143.10.1/7000 to the calling subscriber.

S304: A 183 response that is sent by the called subscriber to the softswitch and is used for responding to session establishment also carries a user plane address of the called subscriber, for example, 183.11.1.1/4008.

S305: The softswitch changes a remote-end address of T2 by using a Mod process of the H.248 signaling, into T2 (a remote-end address 183.11.1.1/4008, a local-end address 10.143.10.2).

S306: A monitoring system obtains an association relationship between user plane addresses. By using the H.248 signaling collected between the softswitch and the MGW, it can be known that a speech channel whose remote-end address is 175.144.1.1/5000 and local-end address is 10.143.10.1/7000, and a speech channel whose remote-end address is 183.11.1.1/4008 and local-end address is 10.143.10.2/6000 belong to a same call/session.

S307: The monitoring system compares a collected first SIP message, between the softswitch and the calling subscriber, carrying the user plane addresses 175.144.1.1/5000 and 10.143.10.1/7000, and a collected second SIP message, between the softswitch and the called subscriber, carrying the user plane addresses 183.11.1.1/4008 and 10.143.10.2/6000; and if it is determined that an association exists between the first SIP message and the second SIP message, the monitoring system performs session association on the first SIP message and the second SIP message.

Figure 6:
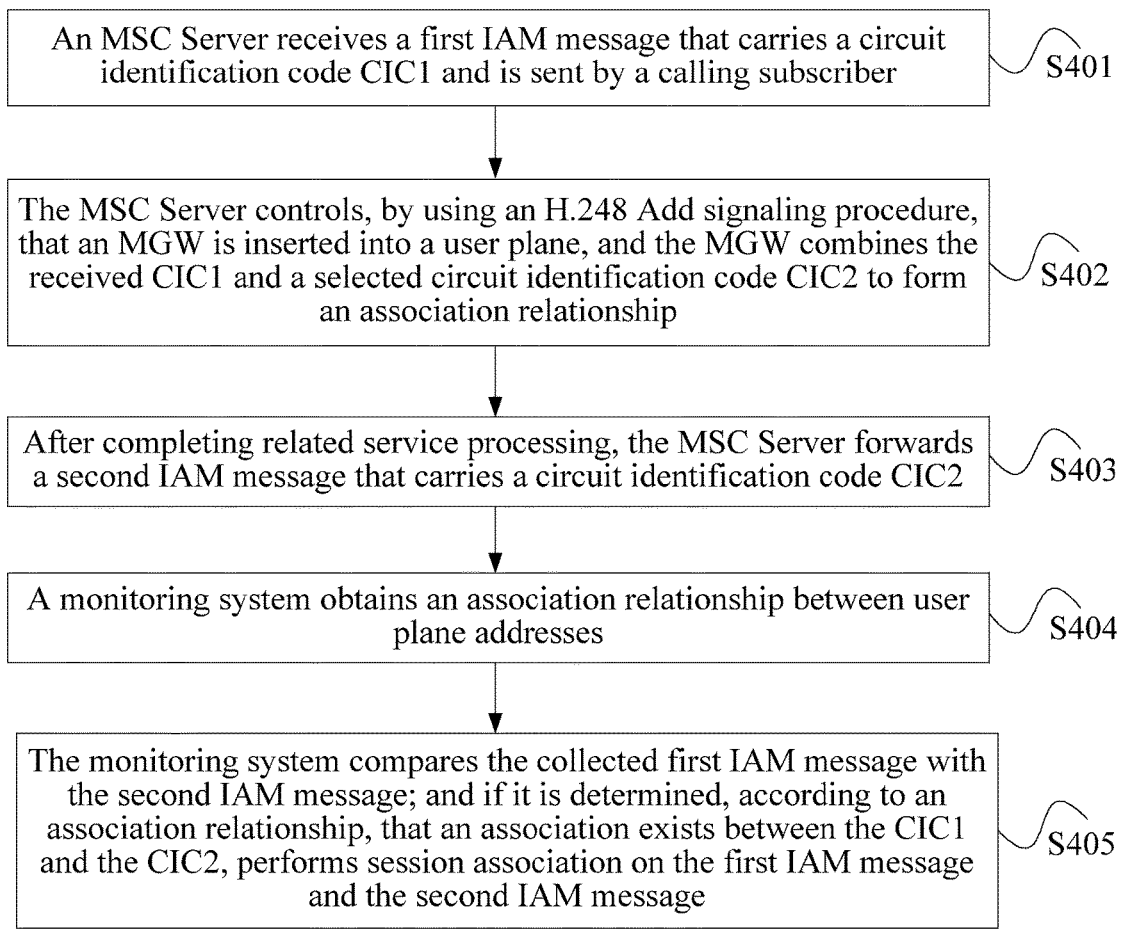
FIG. 6 is a flowchart of Embodiment 4 of a session association method according to the present invention.
Figure 7:
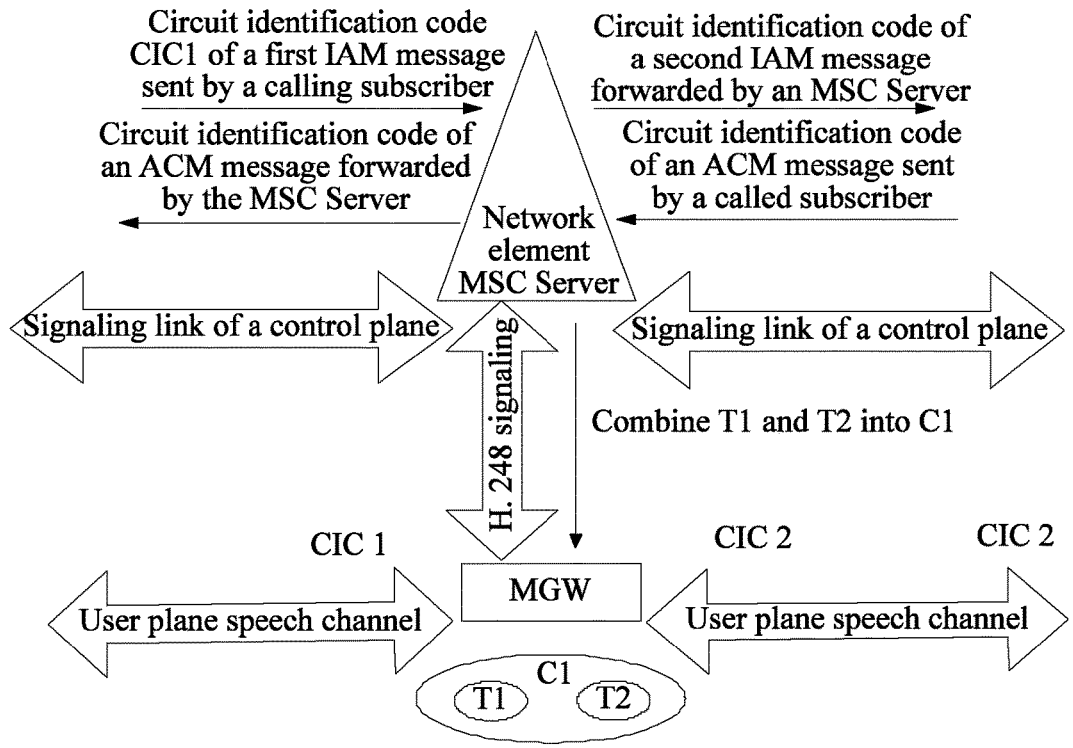
FIG. 7 is a schematic diagram of call control signaling and network elements in Embodiment 4 of the session association method according to the present invention.

FIG. 6 is a flowchart of Embodiment 4 of a session association method according to the present invention. FIG. 7 is a schematic diagram of call control signaling and network elements in Embodiment 4 of the session association method according to the present invention. With reference to FIG. 7, in this embodiment, description is made by using an example in which a communications network is a circuit switched bearer network and speech channel information is a circuit identification code, for example, the network elements are an MSC Server and an MGW, and call control signaling is a first initial address message (IAM) in an ISUP message. As shown in FIG. 6 and FIG. 7, the method in this embodiment may include the following steps.

S401: An MSC Server receives a first IAM message that carries a circuit identification code CIC1 and is sent by a calling subscriber.

S402: The MSC Server controls, by using an H.248 Add signaling procedure, that an MGW is inserted into a user plane, and the MGW combines the received CIC1 and a selected circuit identification code CIC2, and combines T1 and T2 into C1, where T1 corresponds to CIC1, and T2 corresponds to CIC2, so as to form an association relationship.

S403: After completing related service processing, the MSC Server forwards a second IAM message that carries a circuit identification code CIC2. In addition, the called subscriber sends an address complete message (ACM) that carries a circuit identification code CIC2 to the MSC Server, and the MSC Server forwards the ACM message that carries a circuit identification code CIC1.

S404: A monitoring system obtains an association relationship between user plane addresses, and the monitoring system can know, by using the H.248 signaling collected between the MSC Server and the MGW, that a speech channel whose circuit identification code is CIC1 and a speech channel whose circuit identification code is CIC2 belong to a same call/session.

S405: The monitoring system compares the collected first IAM message, between the MSC Server and the calling subscriber, carrying the circuit identification code CIC1, and the collected second IAM message, between the MSC Server and the called subscriber, carrying the circuit identification code CIC2; and if it is determined, according to an association relationship, that an association exists between the CIC1 and the CIC2, performs session association on the first IAM message and the second IAM message.

Figure 8:
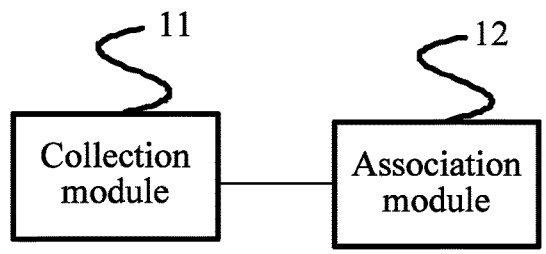
FIG. 8 is a schematic structural diagram of Embodiment 1 of a monitoring apparatus according to the present invention.

FIG. 8 is a schematic structural diagram of Embodiment 1 of a monitoring apparatus according to the present invention. As shown in FIG. 8, the monitoring apparatus in this embodiment may include a collection module 11 and an association module 12.

The collection module 11 is configured to collect call control signaling, on a signaling link of a control plane in a communications network, transmitted by network elements, where the call control signaling includes speech channel information.

The association module 12 is configured to perform session association on the call control signaling according to the speech channel information.

Further, the collection module 11 is configured to collect first call control signaling, on the signaling link of the control plane, between the network elements and a calling subscriber, and second call control signaling, on the signaling link of the control plane, between the network elements and a called subscriber; and the association module 12 is configured to perform session association on the first call control signaling and the second call control signaling according to the speech channel information.

Further, when the communications network is a packet switched bearer network, and the speech channel information is a user plane address, the association module 12 is configured to, if a first user plane address included in the first call control signaling and a second user plane address included in the second call control signaling are the same, perform session association on the first call control signaling and the second call control signaling.

The monitoring apparatus in this embodiment may be configured to execute the technical solution of the method embodiment shown in FIG. 1, and its implementation principle is similar and is not described herein again.

According to the monitoring apparatus provided in this embodiment, a collection module collects call control signaling, on a signaling link of a control plane in a communications network, transmitted by network elements, where the call control signaling includes speech channel information; and an association module performs session association on the call control signaling according to the speech channel information. Because of inevitability and uniqueness of a speech channel in a call/session, the monitoring apparatus can implement accurate association by performing session association according to the speech channel information, so as to improve accuracy of session association, further improve reliability of a communications network monitoring apparatus, and provide a reliable guarantee for the monitoring apparatus to evaluate and analyze a communications network from the perspective of a whole network, a user, and a service, thereby providing end-to-end network quality, user sensing, quality of service, end-to-end call/session tracking, and complaint and fault processing.

Figure 9:
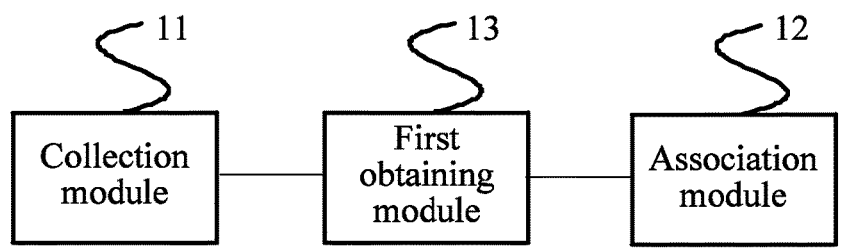
FIG. 9 is a schematic structural diagram of Embodiment 2 of a monitoring apparatus according to the present invention.

FIG. 9 is a schematic structural diagram of Embodiment 2 of a monitoring apparatus according to the present invention. As shown in FIG. 9, based on the structure of the monitoring apparatus shown in FIG. 8, when the communications network is a packet switched bearer network, and the speech channel information is a user plane address, the monitoring apparatus in this embodiment may further include a first obtaining module 13, where the first obtaining module 13 is configured to, before the collection module 11 collects the first call control signaling, on the signaling link of the control plane, between the network elements and the calling subscriber, and the second call control signaling, on the signaling link of the control plane, between the network elements and the called subscriber, obtain an association relationship between user plane addresses.

In this case, the association module 12 is configured to, if it is determined, according to the association relationship, that an association exists between a first user plane address included in the first call control signaling and a second user plane address included in the second call control signaling, perform session association on the first call control signaling and the second call control signaling.

The monitoring apparatus in this embodiment may be configured to execute the technical solution of the method embodiment shown in FIG. 1, and its implementation principle is similar and is not described herein again.

Figure 10:
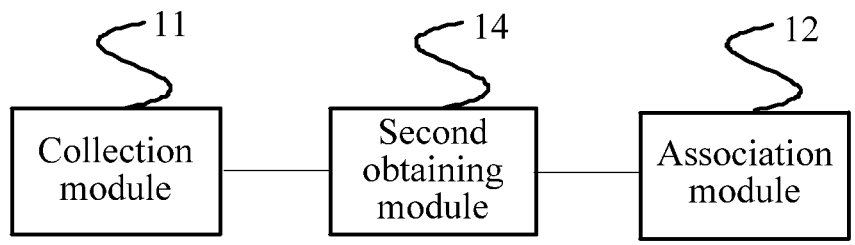
FIG. 10 is a schematic structural diagram of Embodiment 3 of a monitoring apparatus according to the present invention.

FIG. 10 is a schematic structural diagram of Embodiment 3 of a monitoring apparatus according to the present invention. As shown in FIG. 10, based on the structure of the monitoring apparatus shown in FIG. 8, when the communications network is a circuit switched bearer network, and the speech channel information is a circuit identification code, the monitoring apparatus in this embodiment may further include a second obtaining module 14, where the second obtaining module 14 is configured to, before the collection module 11 collects the first call control signaling, on the signaling link of the control plane, between the network elements and the calling subscriber, and the second call control signaling, on the signaling link of the control plane, between the network elements and the called subscriber, obtain an association relationship between circuit identification codes.

In this case, the association module 12 is configured to, if it is determined, according to the association relationship, that an association exists between a first circuit identification code included in the first call control signaling and a second circuit identification code included in the second call control signaling, perform session association on the first call control signaling and the second call control signaling.

The monitoring apparatus in this embodiment may be configured to execute the technical solution of the method embodiment shown in FIG. 1, and its implementation principle is similar and is not described herein again.

In the foregoing embodiment, the call control signaling includes a SIP, a SIP-I, a SIP-T, BICC, an ITU-T H.323 protocol family, a BSSMAP, a RANAP, an ISUP, a TUP, an ITU-T H.248 protocol family, an MGCP, and an ITU-T Q.931 protocol family.

A communications system provided in an embodiment of the present invention includes a monitoring apparatus and at least one network element in a communications network, where the monitoring apparatus collects call control signaling, on a signaling link of a control plane in the communications network, transmitted by network elements, where the call control signaling includes speech channel information; and performs session association on the call control signaling according to the speech channel information.

Further, the monitoring apparatus is configured to collect first call control signaling, on the signaling link of the control plane, between the network elements and a calling subscriber, and second call control signaling, on the signaling link of the control plane, between the network elements and a called subscriber; and perform session association on the first call control signaling and the second call control signaling according to the speech channel information.

The communications network is a CS network, and the network elements include an MSC Server or an MSC Server and an MGW; or the communications network is an NGN network, and the network elements include a fixed-line softswitch or a softswitch and an AG/TG; or the communications network is an IMS network, and the network elements include a CSCF, a BGCF, an IBCF, an MGCF, and an AS; an IBCF and a TrGW, an MGCF and an IM-MGW, an MRFC and an MRFP, and an SPDF and a BGF; or an MGCF and an IM-MGW.

Figure 11:
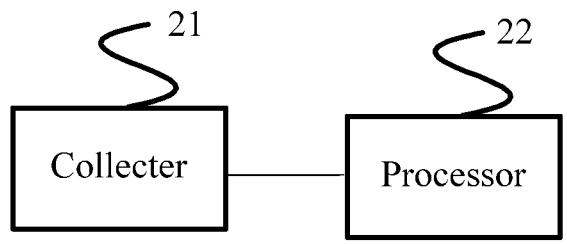
FIG. 11 is a schematic structural diagram of Embodiment 4 of a monitoring apparatus according to the present invention.

FIG. 11 is a schematic structural diagram of Embodiment 4 of a monitoring apparatus according to the present invention. As shown in FIG. 11, the monitoring apparatus in this embodiment may include a collector 21 and a processor 22.

The collector 21 is configured to collect call control signaling, on a signaling link of a control plane in a communications network, transmitted by network elements, where the call control signaling includes speech channel information.

The processor 22 is configured to perform session association on the call control signaling according to the speech channel information.

Further, the collector 21 is configured to collect first call control signaling, on the signaling link of the control plane, between the network elements and a calling subscriber, and second call control signaling, on the signaling link of the control plane, between the network elements and a called subscriber; and the processor 22 is configured to perform session association on the first call control signaling and the second call control signaling according to the speech channel information.

Further, when the communications network is a packet switched bearer network, and the speech channel information is a user plane address, the processor 22 is configured to, if a first user plane address included in the first call control signaling and a second user plane address included in the second call control signaling are the same, perform session association on the first call control signaling and the second call control signaling.

The monitoring apparatus in this embodiment may be configured to execute the technical solution of the method embodiment shown in FIG. 1, and its implementation principle is similar and is not described herein again.

According to the monitoring apparatus provided in this embodiment, a collector collects call control signaling, on a signaling link of a control plane in a communications network, transmitted by network elements, where the call control signaling includes speech channel information; and a processor performs session association on the call control signaling according to the speech channel information. Because of inevitability and uniqueness of a speech channel in a call/session, the monitoring apparatus can implement accurate association by performing session association according to the speech channel information, so as to improve accuracy of session association, further improve reliability of a communications network monitoring apparatus, and provide a reliable guarantee for the monitoring apparatus to evaluate and analyze a communications network from the perspective of a whole network, a user, and a service, thereby providing end-to-end network quality, user sensing, quality of service, end-to-end call/session tracking, and complaint and fault processing.

Figure 12:
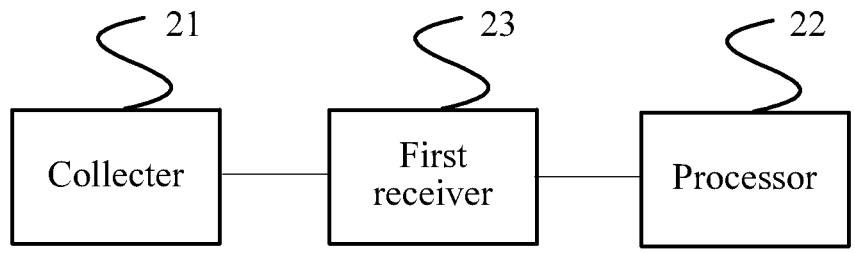
FIG. 12 is a schematic structural diagram of Embodiment 5 of a monitoring apparatus according to the present invention.

FIG. 12 is a schematic structural diagram of Embodiment 5 of a monitoring apparatus according to the present invention. As shown in FIG. 12, based on the structure of the monitoring apparatus shown in FIG. 11, when the communications network is a packet switched bearer network, and the speech channel information is a user plane address, the monitoring apparatus in this embodiment may further include a first receiver 23, where the first receiver 23 is configured to, before the collector 21 collects the first call control signaling, on the signaling link of the control plane, between the network elements and the calling subscriber, and the second call control signaling, on the signaling link of the control plane, between the network elements and the called subscriber, obtain an association relationship between user plane addresses.

In this case, the processor 22 is configured to, if it is determined, according to the association relationship, that an association exists between a first user plane address included in the first call control signaling and a second user plane address included in the second call control signaling, perform session association on the first call control signaling and the second call control signaling.

The monitoring apparatus in this embodiment may be configured to execute the technical solution of the method embodiment shown in FIG. 1, and its implementation principle is similar and is not described herein again.

Figure 13:
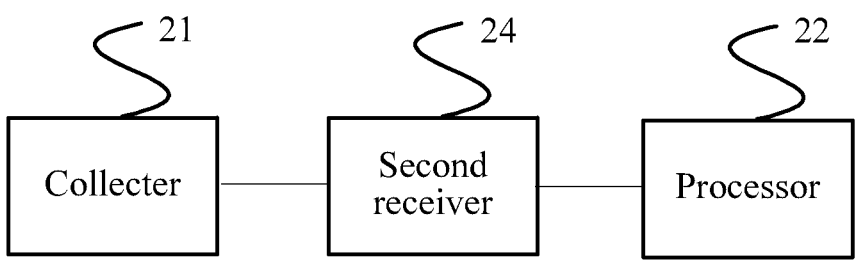
FIG. 13 is a schematic structural diagram of Embodiment 6 of a monitoring apparatus according to the present invention.

FIG. 13 is a schematic structural diagram of Embodiment 6 of a monitoring apparatus according to the present invention. As shown in FIG. 13, based on the structure of the monitoring apparatus shown in FIG. 11, when the communications network is a circuit switched bearer network, and the speech channel information is a circuit identification code, the monitoring apparatus in this embodiment may further include a second receiver 24, where the second receiver 24 is configured to, before the collector collects the first call control signaling, on the signaling link of the control plane, between the network elements and the calling subscriber, and the second call control signaling, on the signaling link of the control plane, between the network elements and the called subscriber, obtain an association relationship between circuit identification codes.

In this case, the processor 22 is configured to, if it is determined, according to the association relationship, that an association exists between a first circuit identification code included in the first call control signaling and a second circuit identification code included in the second call control signaling, perform session association on the first call control signaling and the second call control signaling.

The monitoring apparatus in this embodiment may be configured to execute the technical solution of the method embodiment shown in FIG. 1, and its implementation principle is similar and is not described herein again.

In the foregoing embodiment, the call control signaling includes a SIP, a SIP-I, a SIP-T, BICC, an ITU-T H.323 protocol family, a BSSMAP, a RANAP, an ISUP, a TUP, an ITU-T H.248 protocol family, an MGCP, and an ITU-T Q.931 protocol family.

A communications system provided in an embodiment of the present invention includes a monitoring apparatus and at least one network element in a communications network, where the monitoring apparatus collects call control signaling, in a signaling link of a control plane in the communications network, transmitted by network elements, where the call control signaling includes speech channel information; and performs session association on the call control signaling according to the speech channel information.

Further, the monitoring apparatus is configured to collect first call control signaling, on the signaling link of the control plane, between the network elements and a calling subscriber, and second call control signaling, on the signaling link of the control plane, between the network elements and a called subscriber; and perform session association on the first call control signaling and the second call control signaling according to the speech channel information.

The communications network is a CS network, and the network elements include an MSC Server or an MSC Server and an MGW; or the communications network is an NGN network, and the network elements include a fixed-line softswitch or a softswitch and an AG/TG; or the communications network is an IMS network, and the network elements include a CSCF, a BGCF, an IBCF, an MGCF, and an AS; an IBCF and a TrGW, an MGCF and an IM-MGW, an MRFC and an MRFP, and a SPDF and a BGF; or an MGCF and an IM-MGW.

In the several embodiments provided in the present invention, it should be understood that the disclosed apparatus and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware combining a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) or a processor to perform a part of the steps of the methods described in the embodiments of the present invention. The foregoing storage medium includes any medium that can store program code, such as a universal serial bus (USB) flash drive, a removable hard disk, a read-only memory (ROM), a random access memory (RAM), a magnetic disk, or an optical disc.

It can be clearly understood by persons skilled in the art that, for the purpose of convenient and brief description, division of the foregoing function modules is used as an example for description, in actual implementation, the foregoing functions can be allocated to different modules and implemented according to the need, that is, the inner structure of the apparatus is divided into different function modules to implement all or part of the foregoing functions. For a detailed working process of the foregoing apparatus, reference may be made to a corresponding process in the foregoing method embodiments, and details are not described herein again.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, as long as such modifications or replacements do not cause the essence of corresponding technical solutions to depart from the scope of the technical solutions of the embodiments of the present invention.

What is claimed is:

1. A session association method, comprising:
    collecting call control signaling, on a signaling link of a control plane in a communications network, transmitted by network elements, the call control signaling comprising speech channel information, the communications network comprising a packet switched bearer network, the speech channel information comprising a user plane address, and the call control signaling being collected by:
        collecting first call control signaling, on the signaling link of the control plane, between the network elements and a called subscriber; and
        collecting second call control signaling, on the signaling link of the control plane, between the network elements and the called subscriber; and
    performing session association on the call control signaling according to the speech channel information by:
        performing session association on the first call control signaling and the second call control signaling according to the speech channel information; and
        performing session association on the first call control signaling and the second call control signaling when a first user plane address comprised in the first call control signaling and a second user plane address comprised in the second call control signaling are the same.

2. The method of claim 1, wherein the communications network further comprises a mobile softswitch (CS) network, and the network elements further comprise either a mobile switching center (MSC) server, or the MSC server and a media gateway (MGW).

3. The method of claim 1, wherein the communications network further comprises a fixed-line softswitch (NGN) network, and the network elements further comprise either a softswitch or the SoftSwitch and an access gateway (AG)/a trunk gateway (TG).

4. The method of claim 1, wherein the communications network further comprises an IP multimedia subsystem (IMS) network, and the network elements further comprise a call/session control function (CSCF), a breakout gateway control function (BGCF), an interconnection border control function (IBCF), a media gateway control function (MGCF), and an application server (AS).

5. The method of claim 1, wherein the communications network further comprises an IP multimedia subsystem (IMS) network, and the network elements further comprise an interconnection border control function (IBCF), a transition gateway (TrGW), a media gateway control function (MGCF), an IP multimedia subsystem (IMS) media gateway (IM-MGW), a multimedia resource function controller (MRFC), a multimedia resource function processor (MRFP), a service-based policy decision function (SPDF), and a border gateway function (BGF).

6. The method of claim 1, wherein the communications network further comprises an IP multimedia subsystem (IMS) network, and the network elements further comprise media gateway control function (MGCF) and an IP multimedia subsystem (IMS) media gateway (IM-MGW).

7. A session association method, comprising:
collecting call control signaling, on a signaling link of a control plane in a communications network, transmitted by network elements, the call control signaling comprising speech channel information, the communications network comprising a packet switched bearer network, the speech channel information comprising a user plane address, and the call control signaling comprising:
obtaining an association relationship between user plane addresses;
collecting first call control signaling, on the signaling link of the control plane, between the network elements and a called subscriber; and
collecting second call control signaling on the signaling link of the control plane, between the network elements and the called subscriber; and
performing session association on the call control signaling according to the speech channel information by:
performing session association on the first call control signaling and the second control signaling according to the speech channel information; and
performing session association on the first call control signaling and the second call control signaling when it is determined, according to the association relationship, that an association exists between a first user plane address comprised in the first call control signaling and a second user plane address comprised in the second call control signaling.

8. A monitoring apparatus, comprising:
a memory comprising instructions; and
a processor coupled to the memory, the instructions causing the processor to be configured to:
collect call control signaling, on a signaling link of a control plane in a communications network, transmitted by network elements, the call control signaling comprising speech channel information, the communications network comprising a packet switched bearer network, and the speech channel information comprising a user plane address, and the call control signaling being collected by:
collecting first call control signaling, on the signaling link of the control plane, between the network elements and a called subscriber; and
collecting second call control signaling, on the signaling link of the control plane, between the network elements and the called subscriber; and
perform session association on the call control signaling according to the speech channel information by:
performing session association on the first call control signaling and the second call control signaling according to the speech channel information; and
performing session association on the first call control signaling and the second call control signaling when a first user plane address comprised in the first call control signaling and a second user plane address comprised in the second call control signaling are the same.

9. A monitoring apparatus, comprising:
a memory comprising instructions; and
a processor coupled to the memory, the instructions causing the processor to be configured to:
collect call control signaling, on a signaling link of a control plane in a communications network, transmitted by network elements, the call control signaling comprising speech channel information, the communications network comprising a packet switched bearer network, the speech channel information comprising a user plane address, and the collecting the call control signaling comprising:
collecting first call control signaling, on the signaling link of the control plane, between the network element and a calling subscriber; and
collecting second call control signaling, on the signaling link of the control plane, between the network element and the calling subscriber; and
perform association on the call control signaling according to the speech channel information by performing association on the first call control signaling and the second call control signaling according to the speech channel information;
obtain an association relationship between user plane addresses before collecting the first call control signaling, on the signaling link of the control plane, between the network elements and the calling subscriber, and the second call control signaling, on the signaling link of the control plane, between the network elements and the called subscriber; and
perform session association on the first call control signaling and the second call control signaling when it is determined, according to the association relationship, that an association exists between a first user plane address comprised in the first call control signaling and a second user plane address comprised in the second call control signaling.

10. A communications network monitoring system, comprising:
at least one network element in a communications network; and
a monitoring apparatus configured to:
collect call control signaling, on a signaling link of a control plane in the communications network, transmitted by the at least one network element, the call control signaling comprising speech channel information, the communications network comprising a packet switched bearer network, the speech channel information comprising a user plane address, and the call control signaling being collected by:
collecting first call control signaling, on the signaling link of the control plane, between the network elements and a called subscriber; and
collecting second call control signaling on the signaling link of the control plane, between the network elements and the called subscriber; and
perform session association on the call control signaling according to the speech channel information by:
performing session association on the first call control signaling and the second call control signaling according to the speech channel information; and
performing session association on the first call control signaling and the second call control signaling when a first user plane address comprised in the first call control signaling and a second user plane address comprised in the second call control signaling are the same.

11. The system of claim 10, wherein the communications network further comprises a mobile softswitch (CS) network, and the network elements comprise either a mobile switching center (MSC) server, or the MSC server and a media gateway (MGW).

12. The system of claim 10, wherein the communications network further comprises a fixed-line softswitch (NGN) network, and the network elements comprise either a softswitch or the SoftSwitch and an access gateway (AG)/a trunk gateway (TG).

13. The system of claim 10, wherein the communications network is an IP multimedia subsystem (IMS) network, and the network elements comprise a call/session control function (CSCF), a breakout gateway control function (BGCF), an interconnection border control function (IBCF), a media gateway control function (MGCF), and an application server (AS).

14. The system of claim 10, wherein the communications network further comprises an IP multimedia subsystem (IMS) network, and the network elements comprise an interconnection border control function (IBCF), a transition gateway (TrGW), a media gateway control function (MGCF), an IP multimedia subsystem (IMS) media gateway (IM-MGW), a multimedia resource function controller (MRFC), a multimedia resource function processor (MRFP), a service-based policy decision function (SPDF), and a border gateway function (BGF).

15. The system of claim 10, wherein the communications network further comprises an IP multimedia subsystem (IMS) network, and the network elements comprise media gateway control function (MGCF) and an IP multimedia subsystem (IMS) media gateway (IM-MGW).

* * * * *